United States Patent
Kumar et al.

(10) Patent No.: US 8,209,277 B2
(45) Date of Patent: Jun. 26, 2012

(54) PREDICTING THE OUTCOME OF EVENTS BASED ON RELATED INTERNET ACTIVITY

(75) Inventors: Anurag Kumar, Bangalore (IN); Supreeth Hosur Nagesh Rao, Bangalore (IN); Nangavaram Sundararajan Sekar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 661 days.

(21) Appl. No.: 12/368,180

(22) Filed: Feb. 9, 2009

(65) Prior Publication Data
US 2010/0205131 A1    Aug. 12, 2010

(51) Int. Cl.
*G06F 15/173* (2006.01)
*G06N 5/02* (2006.01)
(52) U.S. Cl. .................................................. 706/46
(58) Field of Classification Search .............. 706/46; 705/10; 707/5
See application file for complete search history.

(56) References Cited

U.S. PATENT DOCUMENTS
2003/0004781 A1 * 1/2003 Mallon et al. ................... 705/10
* cited by examiner

*Primary Examiner* — Alan Chen
*Assistant Examiner* — Ola Olude Afolabi
(74) *Attorney, Agent, or Firm* — Mauriel Kapouytian & Treffert LLP; Ararat Kapouytian

(57) ABSTRACT

Particular embodiments of the present invention are directed to systems and methods for predicting the outcome of events based on internet activity associated with such events. For example, an internet activity metric associated with one or more events may be determined. The internet activity metric may be based at least on the popularity of particular search terms related to the events. The outcomes of the events may also be determined. The determined internet activity metrics and the outcomes of the one or more events may be analyzed to generate an algorithm for predicting the outcomes of subsequent events. For example, an internet activity metric associated with a particular subsequent event (e.g., based at least on the popularity of a particular search term related to the subsequent event) may be determined, and the algorithm may be applied to the internet activity metric to predict the outcome of the particular subsequent event.

19 Claims, 5 Drawing Sheets

PREDICTING THE OUTCOME OF EVENTS BASED ON RELATED INTERNET ACTIVITY

TECHNICAL FIELD

The present disclosure generally relates to analyzing internet activity (e.g., search tem popularity, etc.) to predict the outcome of events.

BACKGROUND

As the popularity of the Internet has increased, so has the prevalence of Web search engines. A Web search engine is a search engine designed to search for information on the World Wide Web (WWW). Information may consist of web pages, images, information and other types of files. Some search engines also mine data available in newsbooks, databases, or open directories. Unlike Web directories, which are maintained by human editors, search engines operate algorithmically or are a mixture of algorithmic and human input.

Web search engines work by indexing information about many web pages, which they retrieve from the WWW itself. When a user enters a query into a search engine (typically by using key words), the engine examines its index and provides a listing of best-matching web pages according to its criteria, usually with a short summary containing the document's title and sometimes parts of the text.

Some search engines generate metrics that measure internet activity related to particular search terms, topics, links, web pages, web sites, etc., which are sometimes used to allow users to discover the current most popular search terms, topics, links, web pages, web sites, etc. Some example search engine internet activity metrics and search engine features based on internet activity metrics include:

- Ask IQ (http://about.ask.com/en/docs/iq/iq.shtml),
- Dogpile SearchSpy (http://www.dogpile.com/info.dogpl/searchspy/),
- MetaCrawler MetaSpy (http://www.metacrawler.com/),
- Google Trends (http://google.com/trends),
- Google Zeitgeist (http://www.google.com/intl/en/press/zeitgeist/index.html),
- Lycos 50 (http://50.lycos.com/),
- Yahoo Buzz Score,
- dWoz Search Phrase Lists (http://www.dwoz.com/default.asp?Pr=122),
- Google AdWords Keyword Tool (https://adwords.google.com/select/KeywordToolExternal), and
- Search Term Research and Search Behavior (http://searchenginewatch.com/showPage.html?page=_subscribers/topics)

To illustrate one example, Yahoo!'s Buzz Score is a metric that helps identify the popularity of a search term by analyzing the search logs traffic. The metric is proportional to the number of searches for a given term and is normalized against the total number of searches on the network. Buzz Score can be segmented across categories of terms, age-gender segments and user locations.

SUMMARY

The present invention provides methods, apparatuses and systems directed to predicting the outcome of events based on internet activity associated with such events. For example, an internet activity metric associated with one or more events may be determined. The internet activity metric may be based at least on the popularity of particular search terms related to the events. The outcomes of the events may also be determined. The determined internet activity metrics and the outcomes of the events may be analyzed to generate an algorithm for predicting the outcomes of subsequent events. For example, an internet activity metric associated with a particular subsequent event (e.g., based at least on the popularity of a particular search term related to the subsequent event) may be determined, and the algorithm may be applied to the internet activity metric to predict the outcome of the particular subsequent event.

DESCRIPTION OF EXAMPLE EMBODIMENT(S)

A. Overview

Particular implementations of the invention are directed to systems and methods for predicting the outcome of a future event based on internet activity related to that event and related events. A prediction application may collect various data, including (a) an internet activity data metric for the future event to be predicted, (b) internet activity data metrics related to one or more other related events, and (c) data indicating the outcome of such other related events. The prediction application may determine a mathematical relationship between the internet activity metrics and the event outcomes for the related events, and generate an algorithm based on such mathematical relationship for predicting the outcome of the future event. The prediction application may then apply the algorithm to the internet activity data metric for the future event in order to predict an outcome for the future event.

Such methodology may be used to predict any of a variety of event outcomes. For example, the methodology can be used to predict movie box office revenues, music album sales, results of reality shows (e.g., American idol, Big brother etc.), subscriber bases of TV shows, attendance/ticket sales for various community events, election results, etc.

The present invention can be implemented in a variety of manners, as discussed in more detail below. Other implementations of the invention may be practiced without some or all of specific details set forth below. In some instances, well known structures and/or processes have not been described in detail so that the present invention is not unnecessarily obscured.

B. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

Figure 1:
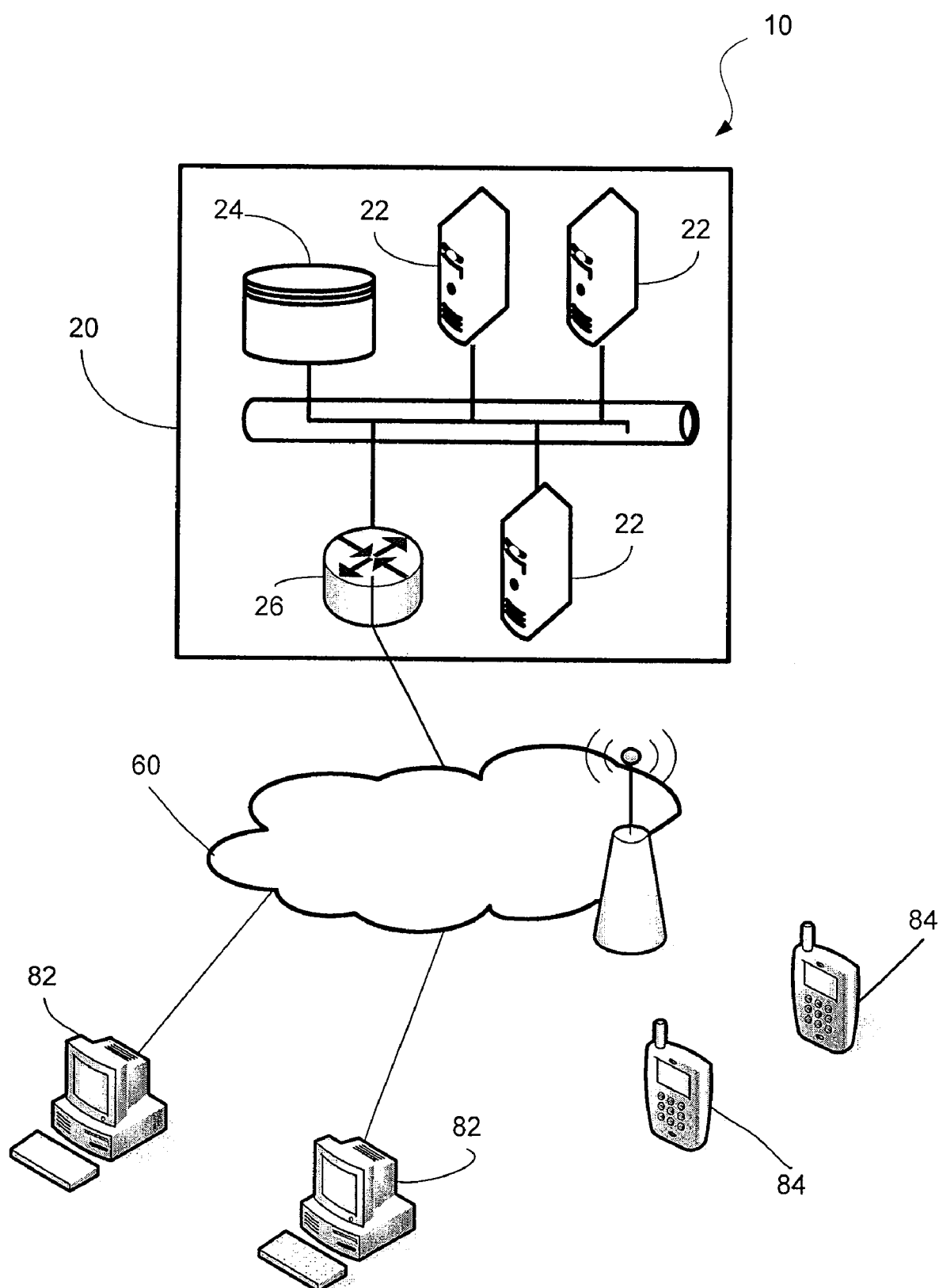
FIG. 1 is a schematic diagram that illustrates an example network environment in which particular implementations of the invention may operate.

As FIG. 1 illustrates, a particular implementation of the invention can operate in a network environment comprising network application hosting site 20, such as an informational web site, social network site and the like. Although FIG. 1 illustrates only one network application hosting site, implementations of the invention may operate in network environments that include multiples of one or more of the individual systems and sites disclosed herein. Client nodes 82, 84 are operably connected to the network environment via a network service provider or any other suitable means.

Network application hosting site 20 is a network addressable system that hosts a network application accessible to one or more users over a computer network. The network application may be an informational web site where users request and receive identified web pages and other content over the computer network. In particular, the network application may be configured to predict event outcomes based on related internet activity metrics, and may provide a user interface for configuring and managing such predictions. The network application may also be a search engine platform, an on-line forum or blogging application where users may submit or otherwise configure content for display to other users. The network application may also be a social network application allowing users to configure and maintain personal web pages, chat, instant message, play interactive games, etc. The network application may also be a content distribution application, such as Yahoo! Music Launchcast®, Apple® iTunes®, and podcasting servers, that displays available content, and transmits content to users.

Network application hosting site 20, in one implementation, comprises one or more physical servers 22 and content data store 24. The one or more physical servers 22 are operably connected to computer network 60 via a router 26. The one or more physical servers 22 host functionality that provides a network application (e.g., a news content site, etc.) to a user. As discussed in connection with FIG. 2, in one implementation, the functionality hosted by the one or more physical servers 22 may include web or HTTP servers, ad serving systems, geo-targeting systems, and the like. Still further, some or all of the functionality described herein may be accessible using an HTTP interface or presented as a web service using REST, SOAP, and/or other suitable protocols.

Content data store 24 stores content as digital content data objects. A content data object or content object, in particular implementations, is an individual item of digital information typically stored or embodied in a data file or record. Content objects may take many forms, including: text (e.g., ASCII, SGML, and HTML), images (e.g., jpeg, tif and gif), graphics (vector-based or bitmap), audio, video (e.g., mpeg), or other multimedia, and combinations thereof. Content object data may also include metadata (e.g., titles, captions, descriptions, annotations, etc.) and executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

Network application hosting site 20, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control.

C. Client Nodes & Example Protocol Environment

A client node is a computer or computing device including functionality for communicating over a computer network. A client node can be a desktop computer 82, laptop computer, as well as mobile devices 84, such as cellular telephones, and personal digital assistants. A client node may execute one or more client applications, (including user interface 102 discussed below with reference to FIG. 2), such as a web browser, to access and view content over a computer network. In particular implementations, the client applications allow a user to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein can communicate over the network 60 using any suitable communications protocols. For example, client nodes 82, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

Figure 2:
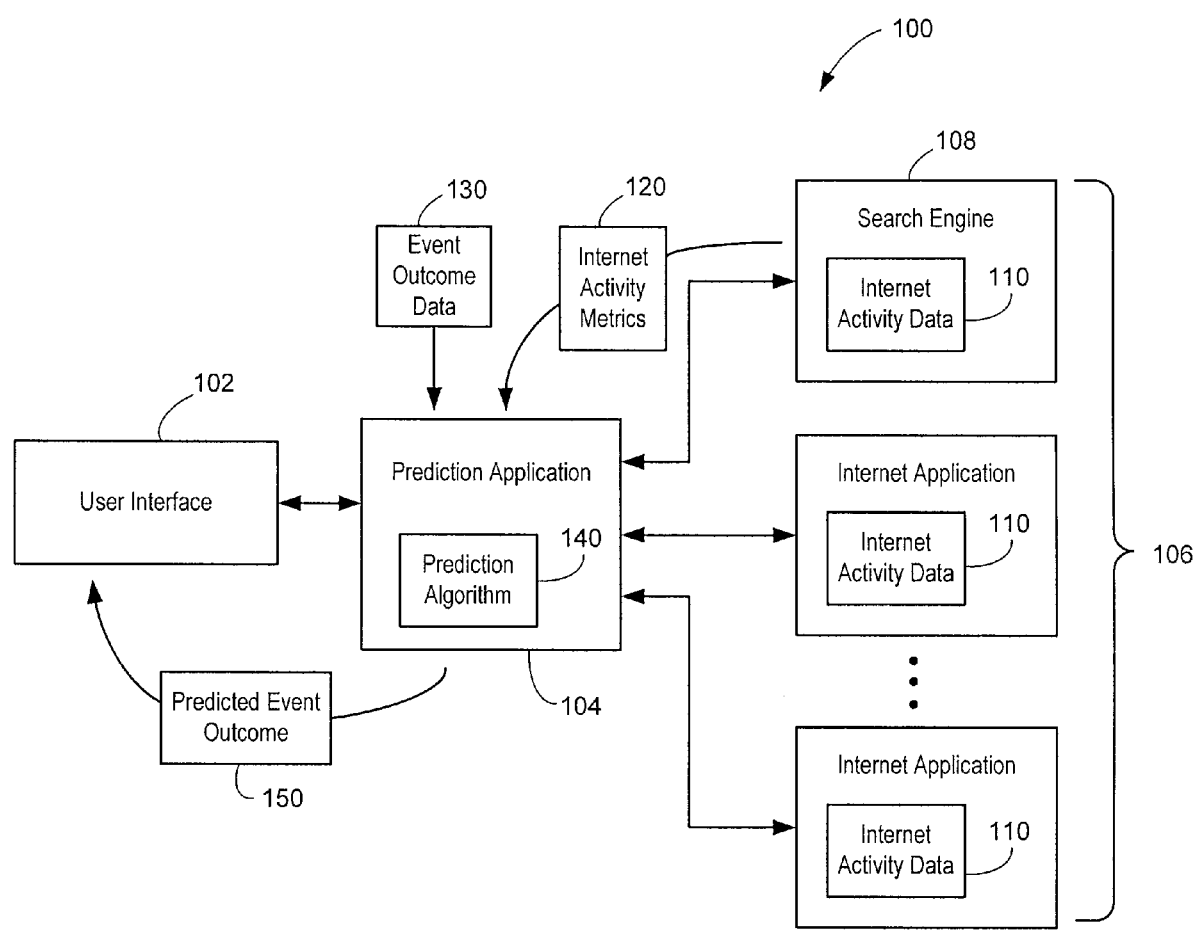
FIG. 2 is a schematic diagram illustrating an example system for predicting the outcome of an event based on internet activity related to that event and related events, according to certain implementations of the invention.

FIG. 2 illustrates an example system 100 for predicting the outcome of an event (or multiple events) based on internet activity (e.g., search term popularity) related to that event and related events, according to certain implementations of the invention. System 100 includes the following functional modules: a user interface 102, a prediction application 104, and one or more internet applications 106.

User interface 102 may comprise any interface allowing a user to interact with prediction application 104. For example, in implementations in which prediction application 104 is a network application hosted at a network application hosting site 20, user interface 102 may comprise a web browser or other network interface hosted on a client node 82, 84. In implementations in which prediction application 104 is a local application hosted on a client node 82, 84, user interface 102 may comprise a user interface portion of prediction application 104 allowing a user to interact with the prediction functionality of prediction application 104.

Internet applications 106 may include any applications configured to collect or record internet activity data 110 regarding internet activity by users. Internet activity data 110 may include any data regarding any action taken by a network user, e.g., browsing history data, search history data, page click data, email data, data regarding actions taken on a social networking application, etc. Example internet applications 106 may include search engines 108, social networking applications (e.g., facebook (http://www.facebook.com), Flickr (http://www.flickr.com), MySpace (http://www.myspace.com), del.icio.us (http://del.icio.us./), etc.), as well as any types of packet sniffers, hit counters, network analyzers, etc.

Each search engine 108 may comprise a search engine designed to search for information on the World Wide Web (WWW). Each search engine 108 may obtain and index information about numerous web pages. When a user enters a query into a search engine (typically by entering search keywords via a web browser), the search engine 108 examines its index and provides a listing of best-matching web pages and/or other data according to particular search engine criteria. Some example search engines 108 include Yahoo! search, Yahoo News, Google search, Google News, Ask.com, Wikia Search, Lexis Nexis, Craigslist, YouTube, PriceGrabber, Answers.com, WebMD, Live Search, PeekYou, and InfoSpace.

Certain internet applications 106 may generate internet activity metrics 120 based on collected internet activity data 110. An internet activity metric 120 may comprise any score, index, metric, or other measure of collected internet activity data 110 regarding one or more particular network objects, e.g., search terms, web pages, web sites, etc. For example, an internet activity metric 120 may be calculated based at least on the determined popularity (e.g., usage) of one or more search terms over a particular period of time. Example internet activity metrics 120 generated by internet applications 106 include the Buzz score by Yahoo!, search metric score by Google Insights, percentage reach by Alexa, etc. Other internet activity metrics 120 may be generated by prediction application 104 based on internet activity data 110 received from internet applications 106, as discussed below.

Prediction application 104 is generally configured to predict the outcome of a future event based on internet activity metrics 120 associated with the future events and one or more related events. As discussed above, prediction application 104 may receive one or more internet activity metrics 120 from one or more internet applications 106. In addition or alternatively, prediction application 104 itself may generate one or more internet activity metrics 120 based on internet activity data 110 received from one or more internet applications 106. Prediction application 104 is discussed in greater detail below in the "Example Operation" section.

Each of the functional modules (user interface 102, prediction application 104, and search engine(s) 106) may be realized by hardware, executable modules (e.g., software, firmware, or other logic) stored on a computer readable medium, or a combination of both. Each functional module, for example, may be hosted on network application hosting site 20 (e.g., on one or more physical servers 22) and/or one or more client computers 82, 84. For example, in some implementations, user interface 102 may be hosted by a client computer 82, 84; and prediction application 104 and search engine(s) 106 may be hosted by one or more physical servers 22 of a network application hosting site 20. In other example implementations, user interface 102 may be hosted by a client computer 82, 84; prediction application 104 may be hosted by one or more physical servers 22 of a first network application hosting site 20; and search engine(s) 106 may be hosted by one or more physical servers 22 of a second network application hosting site 20. In other example implementations, user interface 102 and prediction application 104 may be hosted by a client computer 82, 84; and search engine(s) 106 may be hosted by one or more physical servers 22.

D. Example Operation

In operation, prediction application 104 may predict the outcome of events in the following general manner. Prediction application 104 may generate and/or receive one or more internet activity metrics 120 associated with one or more events. Prediction application 104 may then receive (e.g., automatically via a network or manually entered by user) event outcome data 130 indicating the outcome of the one or more events from any suitable data source, e.g., search data from search engine logs, user click data from web logs, news stories from news aggregation sites, etc. Prediction application 104 may then analyze the internet activity metrics 120 and corresponding event outcome data 130 for one or more events to generate one or more prediction algorithms 140 for predicting the outcomes of one or more future events, indicated as predicted event outcomes 150. For example, prediction application 104 may determine a mathematical relationship between internet activity metrics 120 and their corresponding event outcome data 130, generate a prediction algorithm 140 for using the determined mathematical relationship to determine a predicted event outcome 150 for a future event, and then apply that algorithm to an internet activity metric 120 associated with a future event in order to calculate a predicted event outcome 150 for that future event.

In some embodiments, prediction application 104 may determine whether the internet activity metrics 120 and corresponding event outcome data 130 are sufficiently related for predicting future event outcomes based on the determined mathematical relationship between the internet activity metrics 120 and their corresponding event outcome data 130. Prediction application 104 may calculate a correlation metric between the internet activity metrics 120 and corresponding event outcome data 130, and compare such correlation metric to a predetermined threshold to determine whether the correlation is sufficient for predicting future event outcomes. For example, prediction application 104 may calculate a Pearson correlation coefficient (i.e., between 0 and 1) between the internet activity metrics 120 and corresponding event outcome data 130, and compare the calculated Pearson correlation coefficient to a predetermined threshold (e.g., 0.9) to determine whether the correlation is sufficient for predicting future event outcomes.

In addition, in some embodiments, prediction application 104 may remove one or more internet activity metrics 120 and corresponding event outcome data 130 from the set of data used to determine an overall mathematical relationship between internet activity metrics 120 and corresponding event outcome data 130. For example, prediction application 104 may calculate a correlation metric between a subset of the internet activity metrics 120 and their corresponding event outcome data 130, and determine whether to include or exclude that subset of data in the analysis for determining an overall mathematical relationship between internet activity metrics 120 and corresponding event outcome data 130. For example, suppose a group of internet activity metrics 120 and corresponding event outcome data 130 for a group of events occurring on various dates, with one subset of the events occurring on the same particular date. Prediction application 104 may calculate a correlation metric between the internet activity metrics 120 and corresponding event outcome data 130 for the subset of events (as opposed to a correlation metric for the full group of events), and determine whether to include or exclude that subset of events in the analysis for determining a relationship between internet activity metrics 120 and corresponding event outcome data 130 for the full group of events. In this manner, outlier data may be excluded from the analysis, which may provide a more accurate overall relationship between internet activity metrics 120 and corresponding event outcome data 130. Events may be divided into subsets for such analysis according to any logical grouping, e.g., by event date, type of event, magnitude of metrics 120 and/or event outcome data 130, reliability of metrics 120 and/or event outcome data 130, etc.

As an example of the general methodology discussed above, prediction application 104 may receive from one or more search engines 108 internet activity metrics 120 regarding the popularity of particular search terms related to a group of movies for the week prior to the opening weekend for each movie. The opening weekend for each movie may be the same or different than the opening weekend for each other movie. Prediction application 104 may then receive data 130 indicating the opening weekend sales revenues for each of the group of movies. Such revenue data may be electronically communicated to prediction application 104 from one or more movie studios, or otherwise received and manually entered by a user. Prediction application 104 may then analyze the search term popularity metrics 120 and revenue data 130 (e.g., by applying one or more algorithms) to determine a relationship between the search term popularity metrics 120 and corresponding opening weekend revenue data 130. For example, prediction application 104 may determine a linear relationship, a non-linear (e.g., exponential) relationship, or any other type of mathematical relationship between the search term popularity metrics 120 and corresponding opening weekend revenue data 130. Prediction application 104 may then generate a prediction algorithm 140 for using the determined mathematical relationship to predict revenue data for a future movie (as a predicted event outcome 150).

In some embodiments, prediction application 104 may determine whether the search term popularity metrics 120 and corresponding opening weekend revenue data 130 are sufficiently related for predicting future movie revenues based on the determined mathematical relationship between the search term popularity metrics 120 and corresponding opening weekend revenue data 130, e.g., as discussed above. Also, in some embodiments, prediction application 104 may exclude from the mathematical relationship analysis search term popularity metrics 120 and corresponding opening weekend revenue data 130 for one or more movies determined to be outlier data, e.g., as discussed above.

After determining a relationship between the search term popularity metrics 120 and corresponding opening weekend revenue data 130, prediction application 104 may then use the determined mathematical relationship to predict opening weekend revenues 150 for one or more future movies. For example, prediction application 104 may obtain from one or more search engines 108 internet activity metrics 120 regarding the popularity of particular search term(s) related to a particular soon-to-open movie for the week prior to the movie's opening weekend. Prediction application 104 may then apply the prediction algorithm 140 to the internet activity metrics 120 associated with the soon-to-open movie to predict the opening weekend revenue 150 for the movie.

Any one or more steps in the processes discussed above may be performed automatically by prediction application 104 or in response to a user command, e.g., user commands received via user interface 102.

A more specific example is now discussed. Table 1 below shows data for movies and the box office collections (event outcome data 130) they made during their respective opening weekends, along with a Yahoo Buzz score (an example internet activity metric 120) for related search terms, for dates between Apr. 11, 2008 and Jul. 18, 2008. The Buzz score considered is the 7 day average including the weekend of the respective movie release.

TABLE 1

Example movie opening weekend revenues and corresponding Buzz scores.

| Movie | First Box Office Weekend | | | Local Pearson Correlations for movies with same release date |
|---|---|---|---|---|
| | Release date | Millions ($) | Buzz Score | |
| Dark Knight ™ | 18th July | 159 | 120.56 | 0.999980098 |
| Mamma Mia ™ | 18th July | 27 | 20.63 | |
| Space Chimps ™ | 18th July | 7 | 4.63 | |

TABLE 1-continued

Example movie opening weekend revenues and corresponding Buzz scores.

| Movie | First Box Office Weekend | | | Local Pearson Correlations for movies with same release date |
|---|---|---|---|---|
| | Release date | Millions ($) | Buzz Score | |
| 21 ™ | 8th March | 24 | 18.64 | N/A |
| Street Kings ™ | 11th April | 12 | 11.57 | 1 |
| Prom Night ™ | 11th April | 21 | 17 | |
| Baby Mama ™ | 25th April | 17 | 13.35 | N/A |
| Hancock ™ | 2nd July | 103 | 69.92 | N/A |
| Made of Honor ™ | 2nd May | 14 | 8.52 | N/A |
| Totals | | 384 | 284.82 | |
| | Global Pearson Correlation | 0.997381831 | | |

In this example, the box office collection numbers were obtained from http://www.the-numbers.com.

Table 1 also indicates a correlation metric calculated between the Buzz scores and the weekend box office collections for the group of movies. The correlation metric used in this example is the Pearson correlation coefficient, which can be explained as follows. If we have a series of n measurements of X and Y written as $x_i$ and $y_i$, where i=1, 2, ... n, then the Pearson correlation coefficient is written:

$$r_{xy} = \frac{\sum x_i y_i - n\bar{x}\bar{y}}{(n-1)s_x s_y}$$

$$= \frac{n\sum x_i y_i - \sum x_i \sum y_i}{\sqrt{n\sum x_i^2 - (\sum x_i)^2} \sqrt{n\sum y_i^2 - (\sum y_i)^2}}.$$

$$r_{xy} = \frac{\sum (x_i - \bar{x})(y_i - \bar{y})}{(n-1)s_x s_y},$$

Where:
x-bar and y-bar are the sample means of X and Y,
$s_x$ and $s_x$ are the sample standard deviations of X and Y, and
the sum is from i=1 to n.

The closer the Pearson correlation coefficient is to 1, the more strongly related the two series are. More information regarding correlation calculations can be obtained at http://en.wikipedia.org/wiki/Correlation.

The "Local Pearson Correlations" in right-hand column of Table represent the correlations between Buzz score and box office collections for movies released on the same weekend. The weekends for which only a single movie was released were not considered (and thus indicated as "N/A"). In some embodiments, movies for which the local Pearson Correlations fall below a predetermined threshold (e.g., 0.9) may be excluded from the calculation for determining the mathematical relationship between the Buzz scores and the weekend box office collections for the group of movies.

The "Global Pearson Correlation" is computed across all weekends for a specific period of time (in the example above, weekends from 8th March to 18th July). The movies in the above set are a mix of large, average, and small box office earners. As can be seen in Table 1, The global Pearson correlation is 0.997381831, indicating a very strong correlation between the Buzz scores and the weekend box office numbers.

Using the data in Table 1, prediction application 104 may calculate the relationship between Buzz score and weekend box office numbers. In this example, prediction application 104 determines a strong linear relationship (as indicated by the global Pearson correlation of 0.997381831) and calculates a mathematical relationship by dividing the total box office collections, in $Millions (384) by the total Buzz score (284.82), resulting in a mathematical relationship of 1.3482 $Million per 1.0 Buzz score.

Prediction application 104 may then generate the following prediction algorithm 140 for predicting opening weekend box office revenues for a future movie based on Buzz score for the 7 days including the opening weekend:

Opening weekend box office revenues (in $Millions)
=Buzz score*1.3482

For example, consider the movie Wall-e™ which was released the weekend of Jun. 27, 2008. The Buzz score for Wall-e™ for the 7 day period ending in the opening weekend was 45.92. According to the prediction algorithm 140 above, prediction application 104 would predict opening weekend box office revenues of approximately $61.91 Million. It may be noted that the actual box office collection during that weekend for Wall-e was $63 Million dollars, thus indicating the accuracy of the methodology.

Figure 3:
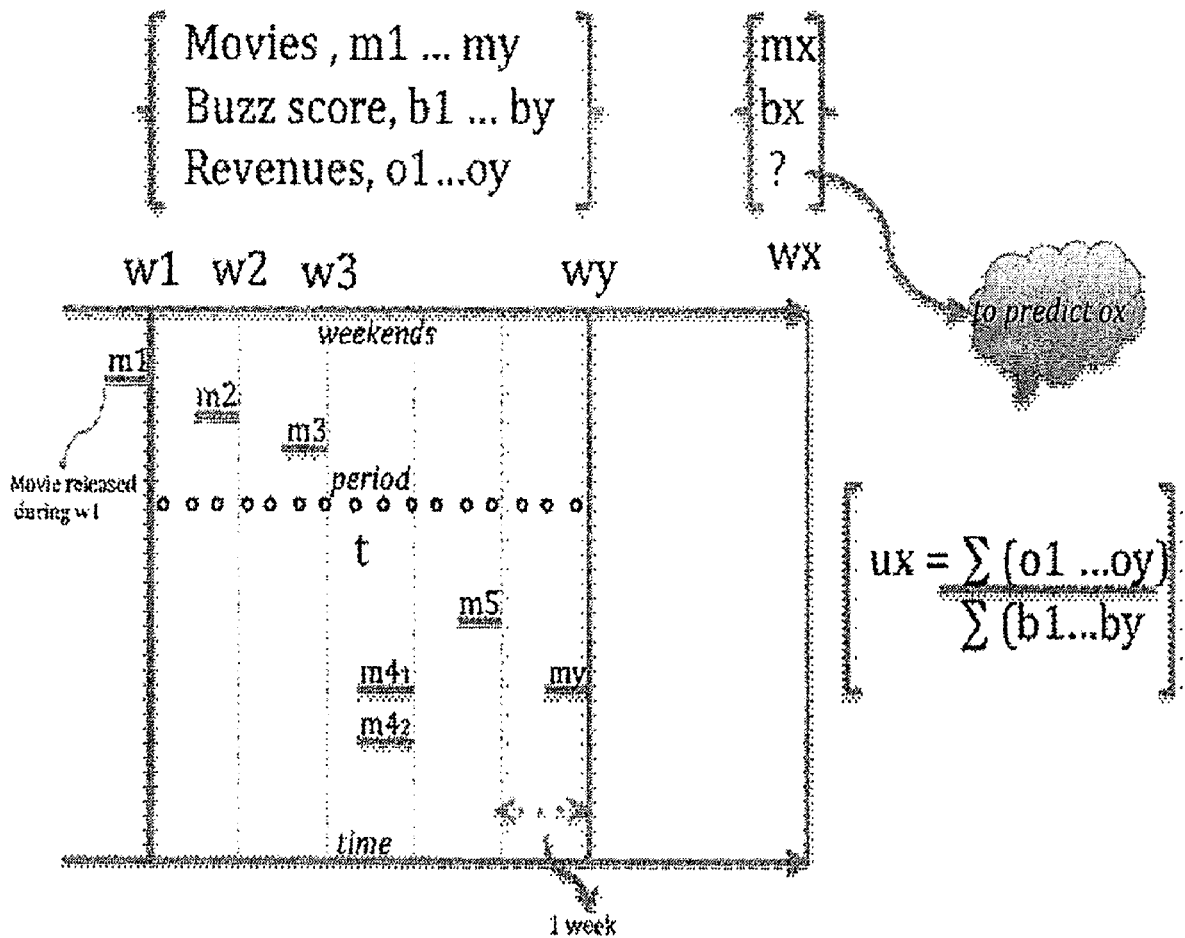
FIG. 3 illustrates an example methodology for predicting sales revenues for a movie based on internet activity related to that movie and other movies, according to one implementation of the invention.
Figure 3:
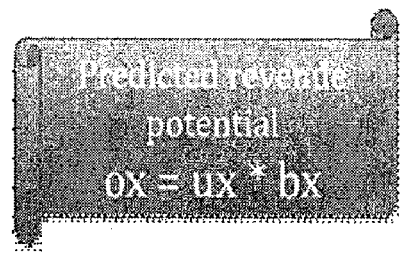
Figure 5:
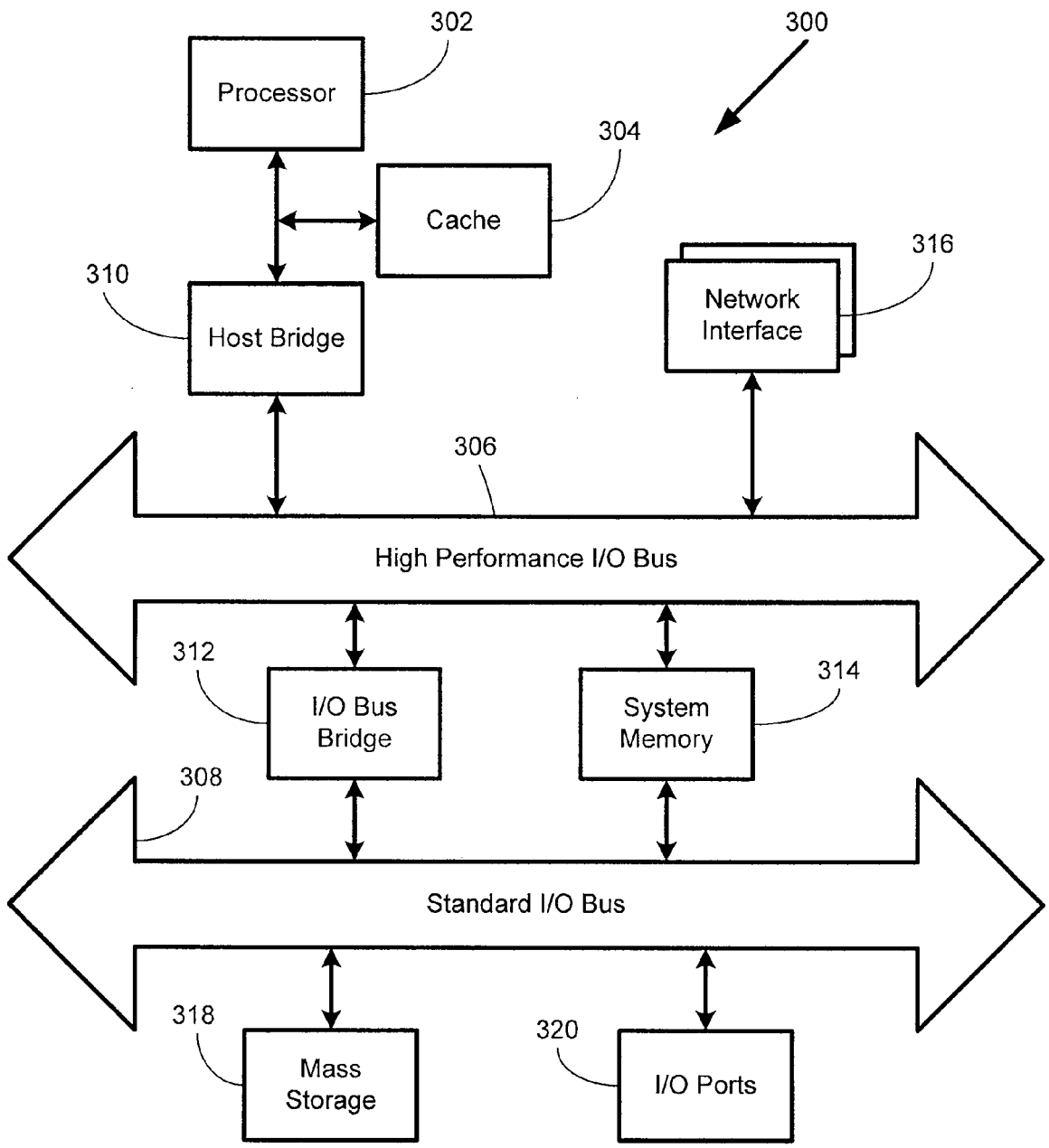
FIG. 5 is a schematic diagram illustrating an example computing system architecture that may be used to implement one or more of physical servers depicted in FIG. 1.

FIG. 3 illustrates a visual aid for understanding an example algorithm for predicting the opening weekend revenue potential (ox) for a movie mx releasing during its release weekend wx, according to one implementation of the present disclosure. As illustrated in FIG. 5, the algorithm includes:

Step 1) Let {m1 ... my} be the set of movies that was released during the each weekend wx-t. In some applications, t is preferably not very large as other factors like inflation, currency value etc ..., may come into picture and undesirably skew the results. For example, for some applications, a recommended value for t is between 15 and 24. In the illustrated example, t = 18.

Step 2) For each movie {m1 ... my}, calculate the 7-day ending average Buzz score on the release weekend {b1 ... by} for that movie.

Step 3) Determine the actual box office revenue {o1 ... oy} for each movie {m1 ... my}.

Step 4) Calculate the relationship between actual box office revenue (o) and Buzz score (b) for the set of movies {m1 ... my} using the equation: ux = Σ(o1 ... oy)/Σ(b1 ... by), where ux represents the revenues ($) per Buzz score unit.

Step 5) Calculate the 7-day ending average Buzz score, bx, for the weekend wx.

Step 6) Calculate the predicted weekend revenues ox for the movie mx for the opening weekend wx using the equation: ox = ux * bx.

It should be understood that this is only one example algorithm for predicting event outcomes according to the present disclosure. Further, "Buzz score" is only one example metric that may be used in such algorithms. Any other type of internet activity metric may similarly be used in such algorithms.

The methodology shown in FIG. 3 and discussed above can be used not only to predict specific weekend revenues, but also for cumulative revenues over multiple weekends. For example, consider the data in Table 2 below for two movies (Prom Night™ and Street Kings™) over seven weekends:

TABLE 2

Example weekly and cumulative movie revenues and corresponding Buzz scores.

| Movie | Release date/weekends | Cumulative revenues ($M) | Revenues per weekend ($M) | Buzz score |
|---|---|---|---|---|
| Prom Night ™ | 11th April | 21 | 21 | 17 |
| | | | 9 | 16 |
| | | | 6 | 7 |
| | | | 3 | 3.81 |
| | | | 1.4 | 2.82 |
| | | | 0.8 | 2.26 |
| | 23rd May | 43 | 0.3 | 1.69 |
| | Pearson correlation | | 0.900943036 | |
| Street Kings ™ | 11th April | 12 | 12 | 11.57 |
| | | | 8 | 9.51 |
| | | | 3 | 4.59 |
| | | | 1.5 | 2.77 |
| | | | 0.4 | 1.79 |
| | | | 0.3 | 1.34 |
| | 23rd May | 26 | 0.2 | 1.94 |
| | Pearson correlation | | 0.992207903 | |

As shown in Table 2, for each movie, a Pearson correlation between weekend revenues and corresponding Buzz scores over the seven week period was calculated. The Pearson correlation for the Prom Night™ movie was 0.900943036, while the Pearson correlation for the Street Kings™ movie was 0.992207903.

The high correlation for both movies reinforces the accuracy of using Buzz scores or other internet activity metrics 120 for predicting movie revenues over multiple weekends. This methodology can be used to predict revenue or other monetization potential of various types of entertainment events, based on the correlation coefficient between the relevant internet activity metric 120 (e.g., Buzz score) and revenue earned for the relevant type of entertainment over a defined time period.

Figure 4:
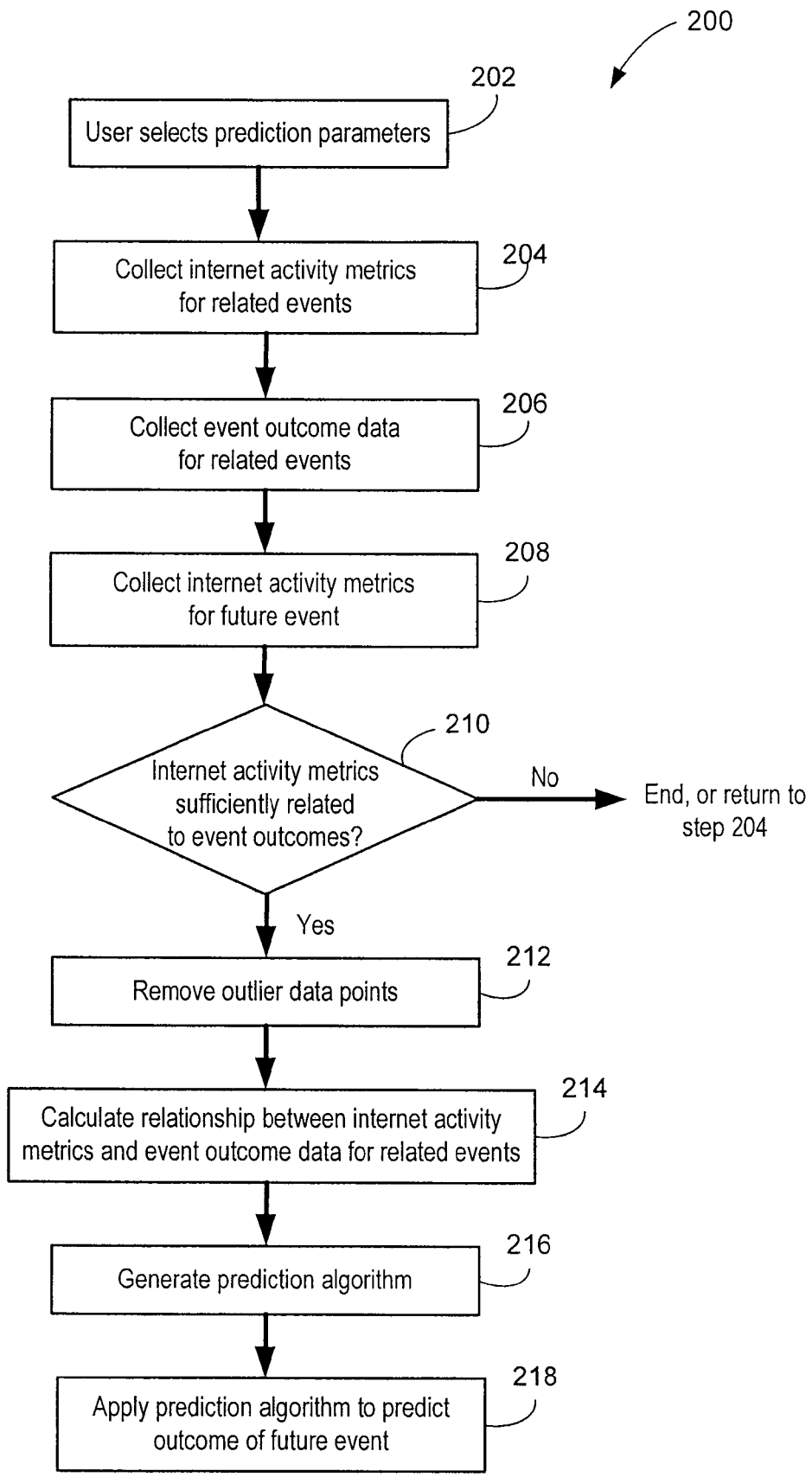
FIG. 4 illustrates a flowchart of an example method for predicting the outcome of an event based on internet activity related to that event and related events, according to certain implementations of the invention.

FIG. 4 illustrates a flowchart of an example method 200 for predicting event outcomes 150 for particular events based on known event outcomes 130 and internet activity metrics related to such events, according to certain embodiments of the present invention. Method 200 may be implemented by system 100 or any other suitable system, e.g., as discussed herein.

At step 200, a user may interact with user interface 102 for prediction application 104, e.g., via a client node 82, 84. Prediction application 104 may present the user (via user interface 102) an interface for managing an outcome prediction process. For example, prediction application 104 may present the user an interface for selecting or inputting various parameters for predicting the outcome of a future event, such as any one or more of:

(a) the identity and/or details of the future event,
(b) the identity and/or details of the event outcome 150 to be predicted for the future event,
(c) the identity and/or measured values for one or more internet activity metrics 120 and/or internet activity data 110 related to the future event to be predicted (which may include in some embodiments one or more keywords or search terms related to the future event),
(d) how to access such internet activity metric(s) 120 and/or internet activity data 110 related to the future event to be predicted (e.g., an identity of a search engine or other internet application 106 from which to access such internet activity metric(s) 120 and/or internet activity data 110),
(e) the identity and/or details of one or more related events to the future event,
(f) the identity and/or details of event outcome data 130 for the related event(s),
(g) how to access such event outcome data 130 for the related event(s) (e.g., an identity of another web site or database from which to access such event outcome data 130),
(h) the identity and/or measured values for one or more internet activity metrics 120 and/or internet activity data 110 for the related event(s) (which may include in some embodiments one or more keywords or search terms related to each related event),
(i) how to access such internet activity metric(s) 120 and/or internet activity data 110 for the related events (e.g., an identity of a search engine or other internet application 106 from which to access such internet activity metrics 120 and/or internet activity data 110),
(j) a selection of a prediction algorithm to be used, or particular parameters (e.g., coefficient values) for use with the prediction algorithm to be used, and/or
(k) any other relevant parameters.

Each of the various parameters listed above may be determined automatically by prediction application 104, or selected by a user, depending on the particular implementation.

At step 202, the user may make various parameter selections and/or input data in any suitable manner, e.g., using a keyboard, mouse, pointer, or any other peripheral device. The user may then select to initiate the future event outcome prediction. In some implementations, the user may initiate the future event outcome prediction after the related events have been completed and event outcome data 130 for such events is available, and after the relevant internet activity metric(s) 120/internet activity data 110 related to the future event are available. In such implementations, prediction application 104 may immediately begin to access the relevant information and process the prediction. In other implementations, the user may initiate the future event outcome prediction before the related events have been completed, before event outcome data 130 for such events is available, or before the relevant internet activity metric(s) 120/internet activity data 110 related to the future event are available. In such implementations, prediction application 104 may wait for the required information to become available (or in some embodiments, to be entered by a user) before continuing with the prediction analysis. Thus, the timing of the following steps of method 200 may vary significantly depending on the particular implementation.

At step 204, prediction application 104 may collect or calculate internet activity metrics 120 for each related event. As discussed above, in some implementations particular internet application(s) 106 may calculate the relevant internet activity metrics 120 for the related events, which prediction application 104 may then obtain from such internet application(s) 106, while in other implementations prediction application 104 may obtain relevant internet activity data 110 for the related events from particular internet application(s) 106 and then calculate the relevant internet activity metrics 120 itself. In some embodiments, prediction application 104 may obtain such metrics 120 and/or data 110 electronically and/or automatically from internet application(s) 106. In other embodiments, a user may manually input (via user interface 102) internet activity metrics 120 for the related events, or internet activity data 110 for the related events from which prediction application 104 may then calculate the relevant internet activity metrics 120.

At step 206, prediction application 104 may collect event outcome data 130 for each related event. In some embodiments, prediction application 104 may obtain event outcome data 130 electronically and/or automatically from one or more relevant internet application(s) 106, other web sites, databases, or other sources of data 130. In other embodiments, a user may manually input (via user interface 102) event outcome data 130 for the related events.

At step 208, prediction application 104 may collect or calculate internet activity metric(s) 120 for the future event to be predicted. As discussed above at step 206, depending on the particular implementation, prediction application 104 either obtain such internet activity metric(s) 120 directly from particular internet application(s) 106, or may obtain relevant internet activity data 110 for the future event from particular internet application(s) 106 and then calculate the relevant internet activity metric(s) 120 itself. Again, depending on the particular implementation, prediction application 104 may obtain such metrics 120 and/or data 110 electronically and/or automatically from internet application(s) 106, or such metrics 120 and/or data 110 may be manually input by a user.

After collecting the various data at steps 204-208, prediction application 104 may have sufficient data to determine a mathematical relationship between internet activity metrics 120 and corresponding event outcome data 130 for the related events related to the future event to be predicted. However, prediction application 104 may first perform some preliminary analysis at steps 210-212, as discussed below.

At step 210, prediction application 104 may determine whether the internet activity metrics 120 and corresponding event outcome data 130 for the related events are sufficiently related for predicting the outcome 150 of the future event. For example, prediction application 104 may calculate one or more correlations between internet activity metrics 120 and corresponding event outcome data 130 for the set of related events, and compare such correlation(s) to one or more predetermined thresholds, e.g., as discussed above regarding FIG. 2. If prediction application 104 determines that the internet activity metrics 120 and corresponding event outcome data 130 for the related events are sufficiently related, the method may continue to step 212. If not, the method may end, or in some embodiments may return to steps 204-206 to collect additional information and re-evaluate until the data are sufficiently related for predicting the outcome 150 of the future event.

At step 212, prediction application 104 may determine whether to exclude any of the related events from the analysis (performed at step 214) for predicting the outcome 150 of the future event. For example, prediction application 104 may determine that the internet activity metrics 120 and corresponding event outcome data 130 for one or more of the related events are not sufficiently related to be included in the determination of the mathematical relationship between internet activity metrics 120 and corresponding event outcome data 130 for the related events. For instance, prediction application 104 may calculate one or more correlations between internet activity metrics 120 and corresponding event outcome data 130 for particular subsets of the related events, and compare such correlation(s) to one or more predetermined thresholds. (A subset of related events may include one or more of the events.) If the calculated correlation for a particular subset of related events falls below the corresponding threshold value, that subset of related events may be deemed an outlier data point and excluded from the calculation of the mathematical relationship between internet activity metrics 120 and corresponding event outcome data 130 for the related events.

In some implementations, steps 210 and 212 may be performed in reverse order. In other words, one or more subsets of the related events may be determined to be outliers and excluded from the set of related events (step 212), and then the remaining set of related events may be evaluated to determine whether the internet activity metrics 120 and corresponding event outcome data 130 for the remaining set of related events are sufficiently related for predicting the outcome 150 of the future event.

At step 214, prediction application 104 may calculate a mathematical relationship between internet activity metrics 120 and corresponding event outcome data 130 for the related events (or the remaining related events if any events were excluded at step 212). Prediction application 104 may apply one or more algorithms to determine a mathematical relationship between the internet activity metrics 120 and corresponding event outcome data 130 for the related events. For example, prediction application 104 may determine a linear relationship, a non-linear (e.g., exponential) relationship, or any other type of mathematical relationship between the internet activity metrics 120 and corresponding event outcome data 130. As an example only (e.g., as implemented in the embodiment discussed above regarding FIG. 3), prediction application 104 may determine a linear relationship between the internet activity metrics 120 and event outcome data 130 by dividing a sum total of event outcome data values by a sum total of internet activity metric values, resulting in a relationship constant C.

At step 216, prediction application 104 may generate a prediction algorithm 140 for using the determined mathematical relationship to predict the outcome 150 of the future event. Prediction algorithm may calculate a predicted outcome 150 based at least on (a) the internet activity metric(s) 120 for the future event obtained at step 208 and (b) the mathematical relationship determined at step 214. For example, where the mathematical relationship is a linear relationship represented by a relationship constant C, prediction application 104 may generate a prediction algorithm 140:

$$\text{predicted outcome} = C^*(\text{internet activity metric 120 for the future event})$$

At step 218, prediction application 104 may apply the prediction algorithm 140 to determine a predicted outcome 150 for the future event.

Although FIG. 4 discloses a particular number of steps to be taken with respect to method 200, method 200 may be executed with greater or fewer steps than those depicted in FIG. 4. For example, steps 210 and/or 212 may be omitted. In addition, although FIG. 4 discloses a certain order of steps to be taken with respect to method 200, the steps comprising method 200 may be completed in any suitable order. For example, as discussed above, step 212 may be performed before step 210.

Method 200 may be used for predicting outcomes of various types of events based on various types of internet activity metrics. As examples only, method 200 may be used to predict the outcome of any of the following types of events, based on any suitable internet activity metrics 120:

(a) An SMS poll based reality TV show (e.g., American Idol, Indian idol, etc.);

(b) A political election that involves public voting;

(c) Movie revenues;

(d) Music album sales;

(e) Attendance/ticket sales for sports events, theatres, music shows, magic shows, circus;

(f) Viewership for television shows or other telecasts (e.g., Asian games, Olympics, Common wealth games, Premiership games, etc.); or (g) Television ratings between television soaps, serials, etc.

The methodology disclosed herein may provide various advantages or uses. For example, the methodology can be used by search engines to monetize their search insights by opening up the search data to businesses such as theatre owners and distributors for use in devising strategies on how to manage movie shows and timings, for example. As another example, advertisers may use this methodology to devise advertising strategies and assign advertising resources, e.g., based on viewership or attendance predictions. As another example, publishers of media events (TV, portals, offline, etc.) can use this methodology to decide how much airtime to allow for various content. As another example, movie producers and production houses can use this methodology to devise strategies for advertising for a movie, both prior to and after the movie release date. As another example, an internet service (e.g., Yahoo, Inc.) can suggest events appropriate for developing micro sites based on the outcomes of this methodology. As another example, an internet service (e.g., Yahoo, Inc.) can use methodology to predict traffic for particular web site content, such that capacity planning can be improved. As another example, a production house can use the results of this methodology for charging a premium or offering a discount on co-branded products.

E. Example Computing System Architectures

While the foregoing systems and methods can be implemented by a wide variety of physical systems and in a wide variety of network environments, the client and server host systems described below provide example computing architectures for didactic, rather than limiting, purposes.

FIG. 5 illustrates an example computing system architecture, which may be used to implement a physical server. In one embodiment, hardware system 300 comprises a processor 302, a cache memory 304, and one or more software applications and drivers directed to the functions described herein. Additionally, hardware system 300 includes a high performance input/output (I/O) bus 306 and a standard I/O bus 308. A host bridge 310 couples processor 302 to high performance I/O bus 306, whereas I/O bus bridge 312 couples the two buses 306 and 308 to each other. A system memory 314 and a network/communication interface 316 couple to bus 306. Hardware system 300 may further include video memory (not shown) and a display device coupled to the video memory. Mass storage 318, and I/O ports 320 couple to bus 308. Hardware system 300 may optionally include a keyboard and pointing device, and a display device (not shown) coupled to bus 308. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 300 are described in greater detail below. In particular, network interface 316 provides communication between hardware system 300 and any of a wide range of networks, such as an Ethernet (e.g., IEEE 802.3) network, etc. Mass storage 318 provides permanent storage for the data and programming instructions to perform the above described functions implemented in the location server 22, whereas system memory 314 (e.g., DRAM) provides temporary storage for the data and programming instructions when executed by processor 302. I/O ports 320 are one or more serial and/or parallel communication ports that provide communication between additional peripheral devices, which may be coupled to hardware system 300.

Hardware system 300 may include a variety of system architectures; and various components of hardware system 300 may be rearranged. For example, cache 304 may be on-chip with processor 302. Alternatively, cache 304 and processor 302 may be packed together as a "processor module," with processor 302 being referred to as the "processor core." Furthermore, certain embodiments of the present invention may not require nor include all of the above components. For example, the peripheral devices shown coupled to standard I/O bus 308 may couple to high performance I/O bus 306. In addition, in some embodiments only a single bus may exist, with the components of hardware system 300 being coupled to the single bus. Furthermore, hardware system 300 may include additional components, such as additional processors, storage devices, or memories.

As discussed below, in one implementation, the operations of one or more of the physical servers described herein are implemented as a series of software routines run by hardware system 300. These software routines comprise a plurality or series of instructions to be executed by a processor in a hardware system, such as processor 302. Initially, the series of instructions may be stored on a storage device, such as mass storage 318. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 316. The instructions are copied from the storage device, such as mass storage 318, into memory 314 and then accessed and executed by processor 302.

An operating system manages and controls the operation of hardware system 300, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method for predicting the outcome of an event, comprising:
   determining an internet activity metric regarding internet activity associated with a particular event for a time period;
   determining one or more related internet activity metrics, each related internet activity metric regarding internet activity associated with a different related event;
   receiving data regarding an outcome of each of the one or more different related events;
   determining a mathematical correlation between the determined one or more related internet activity metrics and the outcome of the one or more different related events;
   excluding outlier data from the received data, wherein the outlier data is data for each event whose determined correlation is below a threshold correlation;
   electronically accessing an algorithm for predicting an outcome of the particular event based at least on the determined internet activity metric; and
   electronically applying the algorithm to the internet activity metric to predict the outcome of the particular event.

2. A method according to claim 1, further comprising:
   generating the algorithm based at least on some of the determined one or more related internet activity metrics.

3. A method according to claim 1, further comprising:
   generating the algorithm based at least on some of (a) the determined one or more related internet activity metrics regarding the internet activity associated with the one or more different related events and (b) the received data regarding the outcomes of the one or more different related events.

4. A method according to claim 1, comprising determining a Pearson correlation coefficient representing the correlation between the determined one or more related internet activity metrics and the outcome of the one or more different related events.

5. A method according to claim 1, wherein determining an internet activity metric regarding internet activity associated with a particular event for a time period comprises determining an internet activity metric based at least on the popularity of a particular search term associated with the particular event.

6. A method according to claim 5, wherein each related internet activity metric is regarding the usage of a different search term associated with a different related event, the method further comprising:
   generating the algorithm based at least on some of the determined one or more related internet activity metrics.

7. A method according to claim 5, wherein each related internet activity metric is regarding the usage of a different search term associated with a different related event, the method further comprising:
   generating the algorithm based at least on some of (a) the determined one or more related internet activity metrics regarding the usage of the one or more different search terms associated with the one or more different related events and (b) the received data regarding the outcomes of the one or more different related events.

8. A method according to claim 5, wherein each related internet activity metric is regarding the usage of the particular search term over a different time period, the method further comprising:
   generating the algorithm based at least on some of the determined one or more related internet activity metrics.

9. A method according to claim 1, wherein:
   the particular event has associated financial revenues; and
   electronically applying the algorithm to the internet activity metric to predict the outcome of the particular event comprises predicting the financial revenues for a particular event.

10. A method according to claim 9, further comprising adjusting one or more aspects of the particular event based on the predicted financial revenues for the particular event.

11. An apparatus, comprising:
    one or more processors;
    one or more network interfaces;
    a memory; and
    computer-executable instructions carried on a computer readable medium, the instructions, when read and executed, for causing the one or more processors to:
       determine an internet activity metric regarding internet activity associated with a particular event for a time period;
       determine one or more related internet activity metrics, each related internet activity metric regarding internet activity associated with a different related event;
       receive data regarding an outcome of each of the one or more different related events;
       determine a mathematical correlation between the determined one or more related internet activity metrics and the outcome of the one or more different related events;
       exclude outlier data from the received data, wherein the outlier data is data for each event whose determined correlation is below a threshold correlation;
       access an algorithm for predicting an outcome of the particular event based at least on the determined internet activity metric; and
       apply the algorithm to the internet activity metric to predict the outcome of the particular event.

12. An apparatus according to claim 11, comprising computer-executable instructions for causing the one or more processors to
    generate the algorithm based at least on some of (a) the determined one or more related internet activity metrics regarding the internet activity associated with the one or more different related events and (b) the received data regarding the outcomes of the one or more different related events.

13. An apparatus according to claim 11, comprising computer-executable instructions for causing the one or more processors to determine a Pearson correlation coefficient representing the correlation between the determined one or more related internet activity metrics and the outcome of the one or more different related events.

14. An apparatus according to claim 11, wherein determining an internet activity metric regarding internet activity associated with a particular event for a time period comprises determining an internet activity metric based at least on the popularity of a particular search term associated with the particular event.

15. An apparatus according to claim 14, wherein each related internet activity metric is regarding the usage of a different search term associated with a different related event, the apparatus further comprising computer-executable instructions for causing the one or more processors to:
generate the algorithm based at least on some of (a) the determined one or more related internet activity metrics regarding the usage of the one or more different search terms associated with the one or more different related events and (b) the received data regarding the outcomes of the one or more different related events.

16. An apparatus according to claim 14, wherein each related internet activity metric is regarding the usage of the particular search term over a different time period, the apparatus further comprising computer-executable instructions for causing the one or more processors to:
generate the algorithm based at least on some of the determined one or more related internet activity metrics.

17. An apparatus according to claim 11, wherein:
the particular event has associated financial revenues; and
electronically applying the algorithm to the internet activity metric to predict the outcome of the particular event comprises predicting the financial revenues for a particular event.

18. An article of manufacture comprising:
a computer readable medium; and
computer-executable instructions carried on the computer readable medium, the instructions, when read and executed, for causing one or more processors to:
determine an internet activity metric regarding internet activity associated with a particular event for a time period;
determine one or more related internet activity metrics, each related internet activity metric regarding internet activity associated with a different related event;
receive data regarding an outcome of each of the one or more different related events;
determine a mathematical correlation between the determined one or more related internet activity metrics and the outcome of the one or more different related events;
exclude outlier data from the received data, wherein the outlier data is data for each event whose determined correlation is below a threshold correlation;
access an algorithm for predicting an outcome of the particular event based at least on the determined internet activity metric; and
apply the algorithm to the internet activity metric to predict the outcome of the particular event.

19. An article of manufacture according to claim 18, wherein determining an internet activity metric regarding internet activity associated with a particular event for a time period comprises determining an internet activity metric based at least on the popularity of a particular search term associated with the particular event.

* * * * *